United States Patent [19]

Lu

[11] Patent Number: 5,338,991
[45] Date of Patent: Aug. 16, 1994

[54] HIGH POWER SOLID STATE RELAY WITH INPUT PRESENCE AND POLARITY INDICATION

[76] Inventor: Chao-Cheng Lu, 4-4, Alley 27, Lane 143, Chun Kung Rd., Taipei, Taiwan, 11614

[21] Appl. No.: 997,695

[22] Filed: Dec. 28, 1992

[51] Int. Cl.⁵ .................. H03K 17/70; H03K 17/78
[52] U.S. Cl. .................. 307/632; 307/236; 307/311
[58] Field of Search ........... 307/113, 311, 631, 632, 307/645, 646, 236

[56] References Cited

U.S. PATENT DOCUMENTS

| | | | |
|---|---|---|---|
| 4,443,712 | 4/1984 | Gokitg | 307/632 |
| 4,594,515 | 6/1986 | Hummel | 307/632 |
| 4,658,145 | 4/1987 | Awaji | 307/632 |
| 4,745,311 | 5/1988 | Iwasaki | 307/632 |
| 4,751,401 | 6/1988 | Beigel et al. | 307/632 |
| 5,053,907 | 10/1991 | Nishi et al. | 307/134 |
| 5,079,457 | 1/1992 | Lu | 307/570 |
| 5,162,682 | 11/1992 | Lu | 307/638 |
| 5,216,203 | 6/1993 | Lu | 307/647 |

FOREIGN PATENT DOCUMENTS

| | | | |
|---|---|---|---|
| 0011671 | 1/1980 | Japan | 307/632 |
| 0148426 | 9/1982 | Japan | 307/632 |

*Primary Examiner*—Timothy P. Callahan
*Assistant Examiner*—Terry D. Cunningham
*Attorney, Agent, or Firm*—Jacobson, Price, Holman & Stern

[57] ABSTRACT

A solid state relay having an input circuit and a triac Darlington circuit coupled by a phototriac circuit. The input circuit having a bipolar indicator lamp for identifying the polarity and presence of an input voltage. The phototriac circuit and the triac Darlington circuit each having bipolar indicator lamps to indicate ON/OFF operation of respective triacs therein.

3 Claims, 1 Drawing Sheet

HIGH POWER SOLID STATE RELAY WITH INPUT PRESENCE AND POLARITY INDICATION

BACKGROUND OF THE INVENTION

The present invention relates to relays, and more specifically to a solid state relay having bipolar indicator lamp incorporated therein.

A solid state relay (SSR) does not work if its power input terminal is connected reversely. Because an ordinary solid state relay does not have any indicator means for indication of correct connection, it may be regarded damaged when does no work.

SUMMARY OF THE INVENTION

The present invention has been accomplished under the aforesaid circumstances. According to the present invention, the input section of the solid state relay is consisted of a dual color indicator lamp, a diode, a limit current resistor and an input of a phototriac coupler. The dual color indicator lamp is consisted of two light emitting diodes of different colors connected reversely for checking the polarity of input voltage. The diode is an ordinary rectifying diode used for protecting the light emitting diode at the input end of the phototriac coupler against reverse flow of voltage. The phototriac coupler is a normal phototriac IC used for ON/OFF control of the intercommunication between the input section and the output section by means of photoelectric effect. The limit current resistor is to provide the dual color indicator lamp and the light emitting diode of the phototriac coupler with the necessary voltage.

The output section of the solid state relay is consisted of the output end of the aforesaid phototriac coupler, a bipolar indicator lamp, a drive triac, and a main triac. The triac of the phototriac coupler is to control ON and OFF operations. The bipolar indicator lamp is consisted of two light emitting diodes reversely connected in parallel for indication of an AC power source. The output section of the solid state relay of the present invention comprises a total of three indicator lamps, one for ON/OFF indication of the phototriac coupler; one for ON/OFF indication of the drive triac; the other for ON/OFF indication of the main triac. Further, the drive triac and the main triac form a darlington circuit for high power output.

DETAILED DESCRIPTION OF THE PREFERRED EMBODIMENTS

Figure 1:
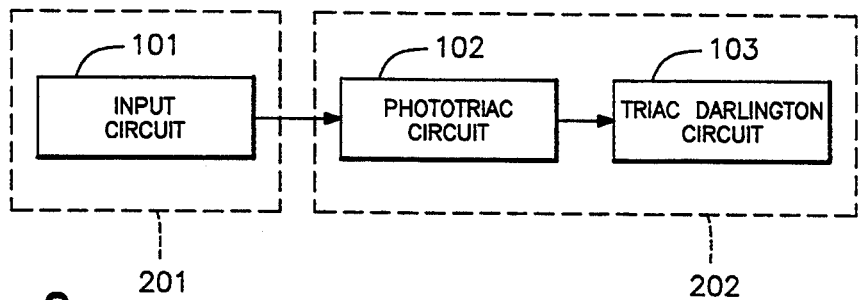
FIG. 1 is a block diagram of a new high power solid state relay according to the present invention.

Referring to FIG. 1, a solid state relay in accordance with the present invention is generally comprised of an input section 201, which is comprised of an input circuit 101, and an output section 202, which is comprised of a phototriac circuit 102 and a triac darlington circuit 103.

Figure 2:
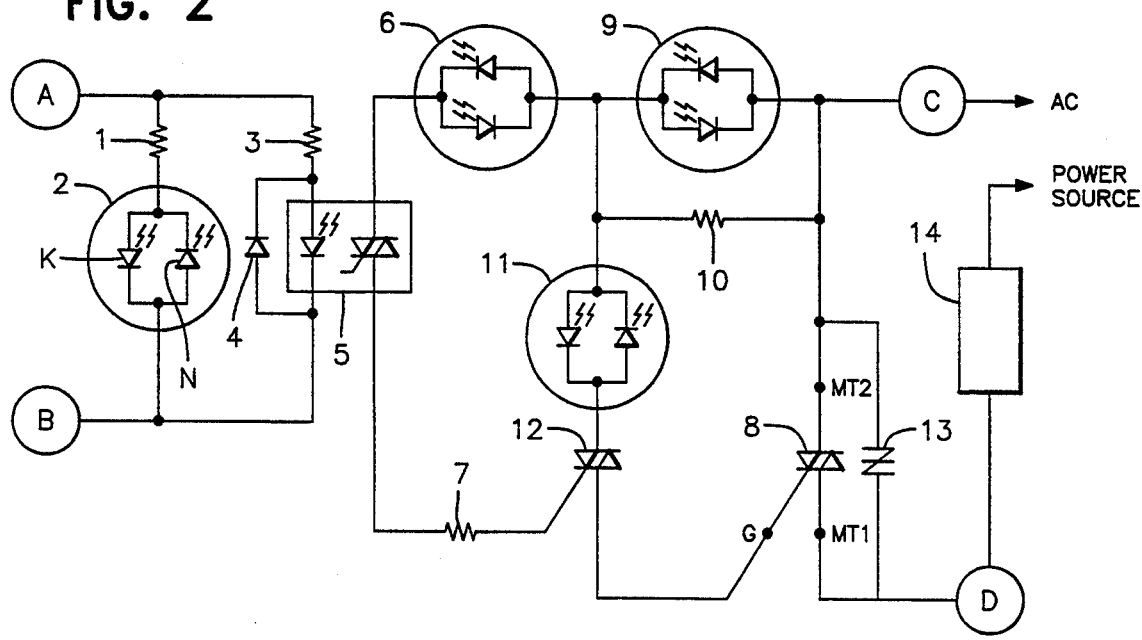
FIG. 2 is a schematic diagram of a new high power solid state relay according to the present invention.

Referring to FIG. 2, when positive voltage and negative voltage are respectively inputted through terminals A and B of the input circuit 101, electric current is transmitted through a limit current resistor 1 to the anode of a light emitting diode (LED) K on one end of a dual color indicator lamp 2 and then transmitted from the anode of the LED K to its cathode. Therefore the LED K is ON, and the other LED N of the dual color indicator lamp 2 is OFF. This means that terminal A has a positive voltage, terminal B has a negative voltage, and electric current passes simultaneously through a limit current resistor 3 to the LED of a phototriac coupler 5 causing its triac ON. If positive voltage is connected to terminal B and negative voltage is connected to terminal A, electric current is then transmitted through the anode of the LED N of the dual color indicator lamp 2 to its cathode and then transmitted through the limit current resistor 1 to terminal A, and therefore the diode N is ON. The two colors of the dual color indicator lamp 2 are used for identifying the positive and negative terminals of power supply voltage; electric current is sent through the diode 4 but not through the light emitting diode of the phototriac coupler 5, thereby causing off of the traic of the phototriac coupler 5.

As the triac of the phototriac coupler 5 is electrically connected, AC power source is sent from end C to end D of the main triac 8, then sent through the load 14 and then returned to the other end. Under this stage, the load 14 is electrically connected, and the main triac 8 is controlled to execute the ON and OFF jobs of the present invention. On the contrary, if the triac of the phototriac coupler 5 is OFF, the main triac 8 is OFF too. According to the aforesaid statement, the bipolar indicator lamps 9,11,8 are all turned on as the main triac 8 is ON, or turned off as the main triac 8 is OFF. The arrangement of the drop voltage resistor 10 is to let the bipolar indicator lamp 9 obtain the necessary working voltage, and also to keep the solid state relay working as the bipolar indicator lamp 9 is damaged. The bipolar indicator lamps 6,11 may also be respective connected with a drop voltage resistor. The arrangement of the varistor, preferably in the form of a sidactor, is to protect the main triac 8 against dv/dt and di/dt as the main triac 8 is controlled to execute the aforesaid ON and OFF jobs. The drive triac 12 and the main triac 8 form a triac darlington circuit for executing high power ON and OFF jobs. As an alternative, dual color indicator lamps may be used to replace the bipolar indicator lamps.

Figure 3:
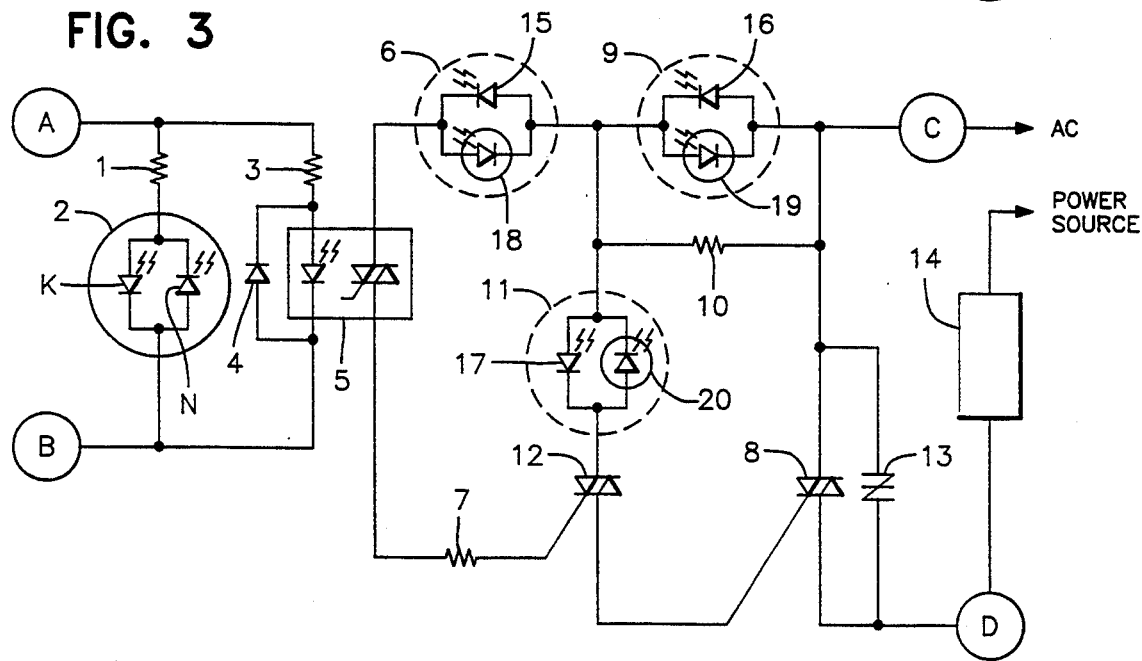
FIG. 3 is a schematic diagram of an alternate form of the new high power solid state relay of the present invention.

Referring to FIG. 3, therein illustrated is an alternate form of the present invention which is suitable for 60 Hz or other AC power source. In this alternate form, diodes 15,16,17 and light emitting diodes 18,19,20 are used to replace bipolar indicator lamps.

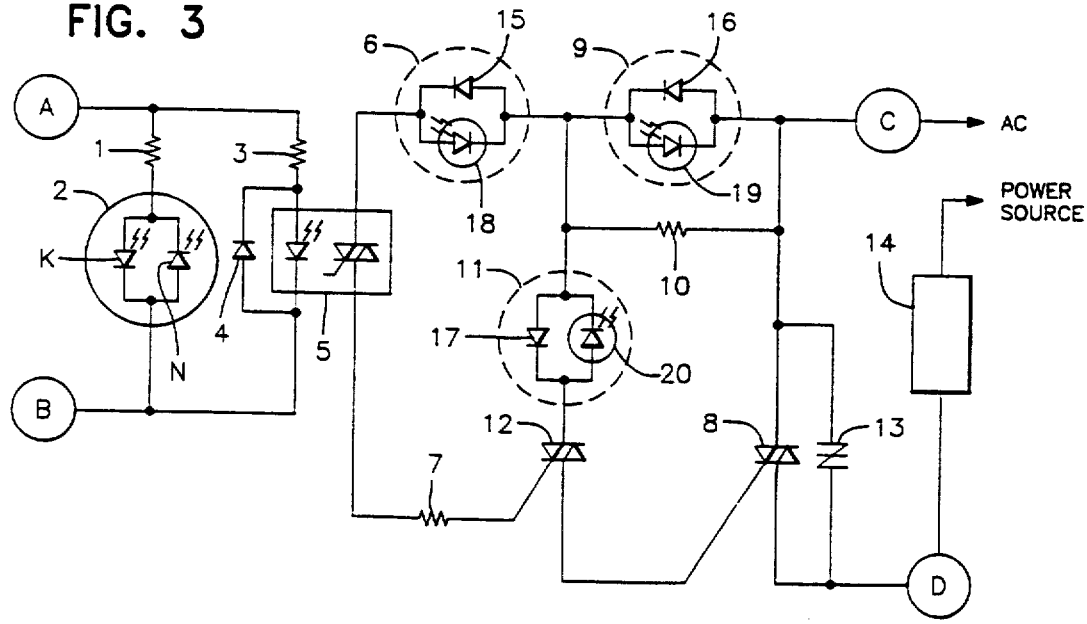

What is claimed is:

1. A solid state relay comprising an input means consisted of an input circuit, and an output means consisted of a phototriac circuit and a triac darlington circuit, said input circuit having two input ends for receiving an input voltage and a first shunt circuit and a second shunt circuit, said first shunt circuit comprising a limit current resistor connected in series to a dual color indicator lamp, the dual color indicator lamp of said first shunt circuit being arranged so as to produce different colors of light for identifying the polarity of the input voltage and its presence, said second shunt circuit comprising a limit current resistor and a light emitting diode of an input end of a phototriac coupler, which corresponds to said phototriac circuit of said output means for control thereof, respectively connected in series, the light emitting diode of said phototriac coupler being reversely connected in parallel with a diode.

2. A solid state relay of claim 1 wherein said output means has two output ends for connecting an AC power source to a load, the phototriac circuit of said output circuit being consisted of a limit current resistor, a bipolar indicator lamp and an output end of said phototriac coupler respectively connected in series, the triac darlington means of said output means being consisted of a drop voltage resistor, a bipolar indicator lamp, a drive triac and a main triac, the drop voltage resistor and bipolar indicator lamp of said triac darlington circuit being connected in parallel, the bipolar indicator lamp coupled to a power source and said main triac, the gate of said drive triac of said triac darlington circuit being directly coupled to the limit current resistor of said phototriac circuit, said drive triac and said main triac being connected to form a darlington circuit, the two opposite ends of said main triac of said triac darlington circuit being connected in parallel to a varistor and forming the two output ends of said output means.

3. A solid state relay according to claim 1 wherein at least one of said bipolar indicator lamps comprises a diode and a LED wherein the P junction terminal and N junction terminal of the diode to the N junction terminal and P junction terminal of the LED respectively.

* * * * *

UNITED STATES PATENT AND TRADEMARK OFFICE
CERTIFICATE OF CORRECTION

PATENT NO. : 5,338,991
DATED : August 16, 1994
INVENTOR(S) : Chao-Cheng LU

It is certified that error appears in the above-indentified patent and that said Letters Patent is hereby corrected as shown below:

In the drawings, Figure 3 has been changed to remove the symbols which designated diodes 15, 16 and 17 as being light-emitting diodes.

Signed and Sealed this

Twenty-eight Day of February, 1995

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,338,991
DATED : August 16, 1994
INVENTOR(S) : Chao-Cheng LU

Page 2 of 2

It is certified that error appears in the above-indentified patent and that said Letters Patent is hereby corrected as shown below:

FIG. 3